March 19, 1963　　　M. C. FUNK　　　3,081,782
MANICURING MODIFICATION FOR ELECTRIC RAZORS
Filed May 23, 1960　　　　　　　　　　　　　8 Sheets-Sheet 1

INVENTOR.
MARCUS C. FUNK
BY
Howard F. Rhea
ATTORNEY

March 19, 1963 M. C. FUNK 3,081,782
MANICURING MODIFICATION FOR ELECTRIC RAZORS
Filed May 23, 1960 8 Sheets-Sheet 2

FIG-4

INVENTOR.
MARCUS C. FUNK
BY
Howard F. Rhea
ATTORNEY

March 19, 1963 M. C. FUNK 3,081,782
MANICURING MODIFICATION FOR ELECTRIC RAZORS
Filed May 23, 1960 8 Sheets-Sheet 3

INVENTOR.
MARCUS C. FUNK
BY
Howard F. Rhea
ATTORNEY

March 19, 1963 M. C. FUNK 3,081,782
MANICURING MODIFICATION FOR ELECTRIC RAZORS
Filed May 23, 1960 8 Sheets-Sheet 6

FIG-18

INVENTOR.
MARCUS C. FUNK
BY
Howard F. Rhea
ATTORNEY

March 19, 1963 M. C. FUNK 3,081,782
MANICURING MODIFICATION FOR ELECTRIC RAZORS
Filed May 23, 1960 8 Sheets-Sheet 7

INVENTOR.
MARCUS C. FUNK
BY
Howard F. Rhea
ATTORNEY

March 19, 1963 M. C. FUNK 3,081,782
MANICURING MODIFICATION FOR ELECTRIC RAZORS
Filed May 23, 1960 8 Sheets-Sheet 8

FIG-23

INVENTOR.
MARCUS C. FUNK
BY
Howard F. Rhea
ATTORNEY

United States Patent Office 3,081,782
Patented Mar. 19, 1963

3,081,782
MANICURING MODIFICATION FOR
ELECTRIC RAZORS
Marcus C. Funk, 1400 Foothill Drive,
Salt Lake City, Utah
Filed May 23, 1960, Ser. No. 31,084
2 Claims. (Cl. 132—73.6)

This invention relates to a manicuring adaptation for electric razors, and particularly, to a manicuring modification of electric razors, said modification employing the razor motor for the activation thereof and the razor housing as a finger support during the manicuring operation.

Various forms of manicuring implements are known to the art, but, so far as the inventor is aware, none of such manicuring implements have envisioned the permanent and inseparable combination of such an implement with an electric razor of the types commonly in use today, wherein the power drive of the razor drives the manicuring abrasive and the razor housing serves as a finger rest. This combination is felt to be a particularly useful configuration since, at least for those who use electric razors, a manicure with the power adaptation of the invention takes only a few seconds, and the opportunity for such nail care comes at the most convenient moment, i.e., when performing other freshening or toilet operations. Furthermore, only one implement is necessary for both shaving and manicuring, said implement being complete of and in itself, with no necessity for interchanging or adding parts or attachments to accomplish the dual function of shaving and manicuring.

In the invention an abrasive strip or disc, depending on the particular electric razor to be modified, is attached to the appropriate part of the razor as will be hereinafter described. The abrasive material may be diamond grit, Carborundum, sandpaper, steel file, or other similar materials or construction. Adjacent to the abrasive strip, an opening is cut in the razor housing and preferably, a shaped notch is formed adjacent to the opening. The shaped notch is constructed so that the center portion thereof is further away from the abrasive strip or disc than the ends thereof so that when the finger is rotated in an arc across the finger rest, the fingernail is caused to be trimmed in the conventional fashion with the center portion thereof extending further from the flesh than do the end portions.

It is, accordingly, an object of the invention herein, to provide a manicuring adaptation for use with electric razors which is economical to construct and convenient to use. It is a further object of the invention to provide a manicuring instrument in combination with an electric razor which is convenient and easy to use, and which is constructed so that nails are trimmed to a desirable configuration.

The invention will be better understood by reference to the following detailed description and drawings wherein.

Figures 1, 2:
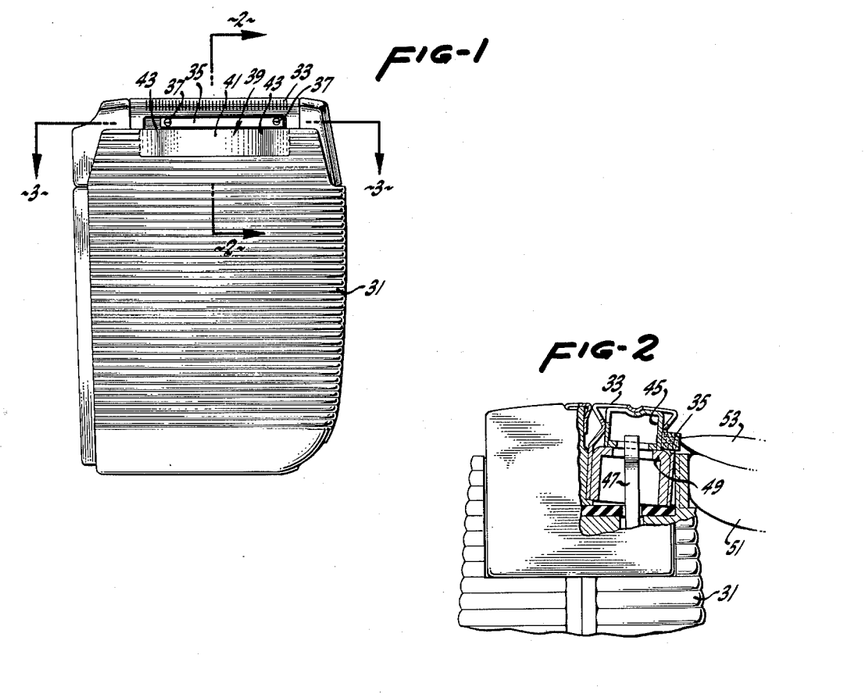
FIGURE 1 is a front elevational view of the electric razor manicuring adaptation of the invention herein as applied to a Schick type razor.
FIGURE 2 is a fragmentary end elevational view, partly in cross section, of the razor adaptation taken along lines 2—2 of FIGURE 1.

Referring first to FIGURE 1, a conventional Schick type housing 31 and shaving head 33 and the manicuring modification of the invention are combined. The manicuring modification includes an abrasive strip 35 mounted to movable blade 45 (FIGURE 2) by means of screws 37, together with a shaped notch 39 having a raised center portion 41 and lowered end portions 43.

In FIGURE 2, abrasive strip 35 is shown to be mounted on movable blade 45 within the shaving head 33. Coupled to movable blade 45 is driving arm 47, which gives blade 45 a reciprocal or back-and-forth movement along bearing surface 49. Finger 51, having fingernail 53, is shown in position to be manicured. This manicuring operation is further detailed in FIGURE 3, which is a cross-section view taken along lines 3—3 of FIGURE 1. Movable blade 45 is driven in a reciprocal movement by driving arm 47 in the directions shown by the arrow adjacent to driving arm 47. This movement imparts a reciprocal motion to abrasive strip 35 which is affixed to movable blade 45 by screws 37. Finger 51 including fingernail 53 occupies, during the manicuring operation, the various positions labelled a, b, and c, and of course other positions intermediary of these points.

Figure 3:
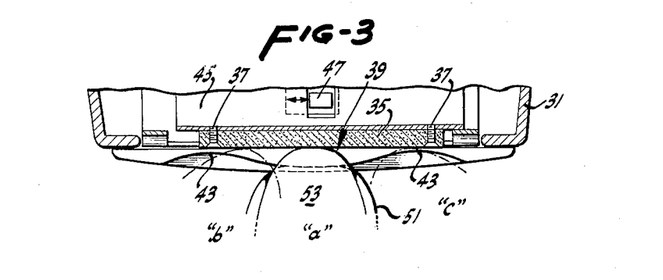
FIGURE 3 is a cross sectional view of the adaptation taken along lines 3—3 of FIGURE 1.

In the operation of the manicuring modification depicted in FIGURES 1, 2 and 3, finger 51 is positioned at approximately a 90° angle with respect to the raised or center portion 41 of shaped notch 39 as shown at a in FIGURE 3. Finger 51 is then rotated between position *a* and positions *b* and *c* in whatever sequence is desired by the operator. With the razor operating, there is a reciprocal movement imparted to abrasive strip 35, and fingernail 53 is trimmed normally with the center portion thereof being further from the flesh than are the end portions thereof, this being the usually desired configuration. As will appear hereinafter however, variations may be made in this contour. To vary the length of fingernail 53, at least two expedients are available. Where longer nails are desired, the finger 51 may be rested only lightly on shaped notch 39. Similarly, where shorter fingernails 53 are desired, finger 51 may be pressed with some degree of force against shaped notch 39. Since the flesh of finger 51 is resilient, increasing pressure will cause finger 51 to be closer to abrasive strip 35 and will result in a shorter or closer manicure. As a second expedient, finger 51 may be deviated vertically from the approximately horizontal position shown in FIGURE 2. To obtain a closer manicure, finger 51 may be raised so that in the view of FIGURE 2 it may be pointing downwardly with respect to razor housing 31. In this position, it is obvious that a shorter manicure will be obtained than in the position depicted in FIGURE 2. Conversely, finger 51 may be lowered with respect to the nearly horizontal position of FIGURE 2 which will result in a longer fingernail 53 after the manicuring operation.

It is readily possible to combine these two expedients to obtain any reasonably desired length of fingernail, and furthermore, these operations may also be varied simultaneously as finger 51 is being rotated as shown in FIGURE 3 from position *a* to positions *b* and *c*. For example, if greater pressure is applied in position *a* and lesser pressure in positions *b* and *c*, a rounded shape of manicure may be obtained notwithstanding the configuration of shaped notch 39. Conversely, light pressure and/or a lowered position of finger 51 may be employed at position *a* and greater pressure and/or a raised position of finger 51 may be employed at positions *b* and *c* to give a manicure sometimes desired by women, wherein the central portion of the manicured nail is much longer than the end portions of said nail. Thus it is seen that various shapes of manicure are readily obtainable if the conventional configuration is not desired.

Figure 4:
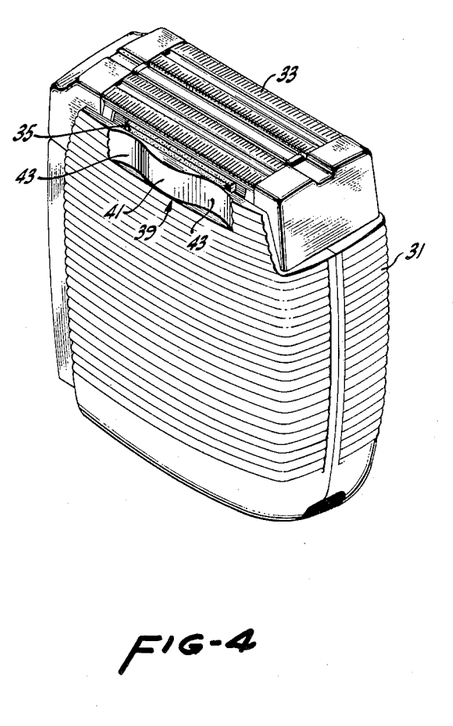
FIGURE 4 is a perspective view of the razor adaptation of FIGURE 1.

FIGURE 4 depicts the same Schick type razor housing 31, shaving head 33, abrasive strip 35 and shaped notch 39 as shown in FIGURES 1, 2 and 3. The configuration of shaped notch 39 includes raised center portion 41 and lowered end portions 43.

Figure 5:
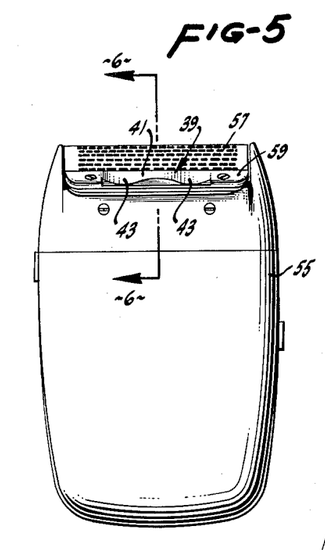
FIGURE 5 is a front elevational view of the electric razor manicuring modification of the invention herein as applied to a Ronson type razor.

Referring now to FIGURE 5, a Ronson type razor housing 55 and shaving head 57 have been modified by the addition of the manicuring implement of the invention. Shaped notch 39 which includes a raised center portion 41 and lowered end portions 43, has been added to the presently existing hair trimming attachment 59, which extends outwardly from housing 55.

Figure 6:
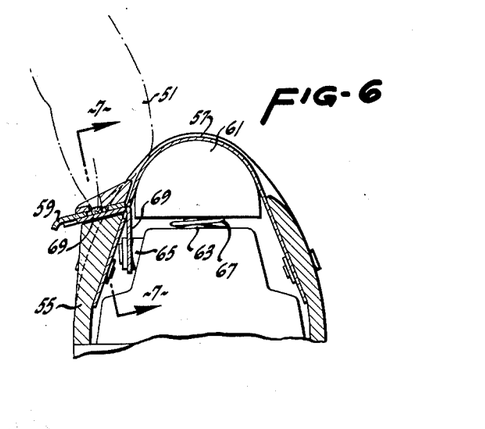
FIGURE 6 is a fragmentary cross sectional view taken along the lines 6—6 of FIGURE 5.

In the sectional view of FIGURE 6, shaving head 57 is mounted on housing 55 and movable blade 61 is constrained within head 57 but kept in close contact with head 57 by spring 67. Blade 61 is moved in a reciprocal fashion by driving arm 63. The modification of the invention has been applied in FIGURES 5, 6 and 7 to trim attachment 59, although this is only one possible location, as will be described hereinafter in connection with FIGURE 8 which shows an alternative location. Trim attachment 59 includes blade 69 driven by arm 65. The addition of shaped notch 39 does not interfere with the hair trimming function of trim attachment 59, since said trimming function is accomplished by teeth located along the outer edge of blade 69. Finger 51, shown in dotted outline, is positioned approximately at right angles to the plane of motion of abrasive strip 35 as before.

Figure 7:
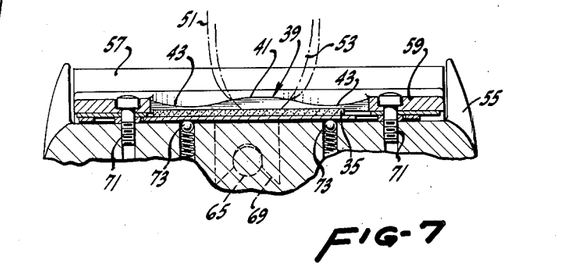
FIGURE 7 is a fragmentary cross sectional view taken along the lines 7—7 of FIGURE 6.

In the view of FIGURE 7, abrasive strip 35 is affixed to blade 69 of hair trimming attachment 59 by any conventional manner, such as adhesives, bonding, or screws. Blade 69 is driven by and loosely connected to shaft 65, which is shown in dotted outline. Shaped notch 39, including raised center portion 41 and lowered end portions 43, is positioned adjacent to abrasive strip 35 along the length thereof. Hair trimming attachment 59 including the modification of the invention is mounted to razor housing 55 by screws 71. Blade 69 moves back and forth slideably on spring mounted bearings 73.

In the operation of the manicuring modification of FIGURES 5, 6 and 7, finger 51 is positioned as shown in FIGURE 6, or, if desired, may be rotated 180° so that the fleshy portion of the finger is outermost rather than innermost with respect to the main body of the razor. In either event, FIGURE 7 depicts the position of finger 51 in dotted outline with respect to shaped notch 39. The remainder of the manicuring operation is as described with respect to FIGURES 1, 2 and 3 with the notation that instead of the movement of the finger being with respect to the horizontal, it is now with respect to the vertical. For example, it will be apparent that if finger 51 is tipped toward the right in FIGURE 6, the manicure will become longer.

Figure 8:
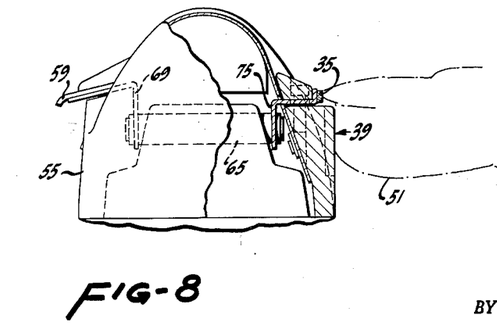
FIGURE 8 is a view, partly in cross section, of an alternative modification of the razor of FIGURE 5.

Referring to FIGURE 8, the modification of the invention has been moved to the side of razor housing 55 opposite from hair trimming attachment 59. Arm 65 has been extended opposite hair trimming attachment 59. A modified blade 75 is loosely mounted on arm 65 and an abrassive strip 35 attached to modified blade 75. Adjacent to abrasive strip 35, a shaped notch 39 is provided for the accomodation of finger 51. Modified blade 75 is preferably mounted as already described in connection with blade 69 shown in FIGURE 7. The operation of the modification of FIGURE 8 is the same as that previously described for FIGURES 1, 2 and 3, since the finger is once more positioned substantially horizontally for the conventional manicure.

Figure 9:
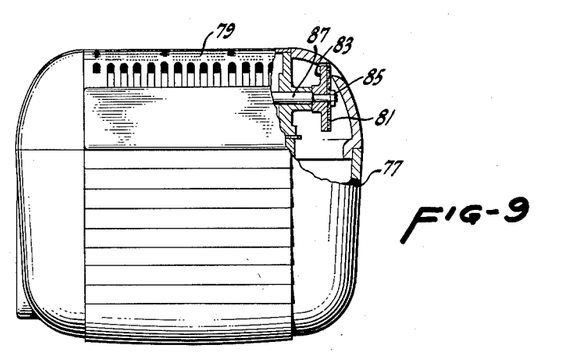
FIGURE 9 is a front elevational view, partly in cross section, of the manicuring adaptation of the invention herein as applied to a Sunbeam type razor.
Figure 10:
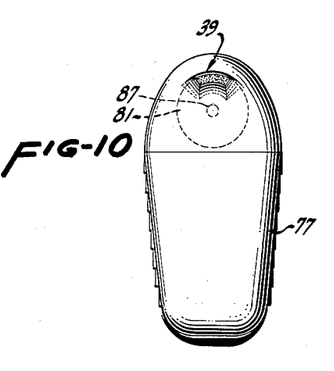
FIGURE 10 is an end elevational view of the adaptation of FIGURE 9.

Referring to FIGURE 9, a Sunbeam type razor housing 77 and a shaving head 79 are combined with a shaft extension 87, extending from the razor blade drive, a wheel 83, and an abrasive disc 81 mounted on said wheel 83 to provide a power drive mainicuring mechanism. Shaft extension 87 is journaled in bearing 89 and wheel 83 is mounted on shaft 87 by means of nut 85. The manicuring adaptation thus formed is mounted on shaft 87 at the end thereof opposite from that of the driving mechanism (not shown). In FIGURE 10 a shaped notch 39 is formed in housing 77. Abrasive disc 81 (in dotted outline) is immediately below shaped notch 39, as is shaft extension 87. In the detailed drawing of FIGURE 11, shaft extension 87 is journaled through bearing 89, and wheel 83 is mounted on the end of shaft 87. Abrasive disc 81 is affixed to said wheel 83. The assembly of wheel 83 and disc 81 is held in place by nut 85 on the end of shaft 87. Disc 81 may also be formed integrally with the wheel 83, as by the deposit on wheel 83 of an abrasive material. Fingernail 53 of finger 51 is projected through shaped notch 39 to contact abrasive disc 81. In the Sunbeam mechanism disc 81 rotates through an arc as depicted by the arrow on wheel 83, although, of course, the same configuration is adaptable to a rotating wheel such as wheel 83.

Figure 11:
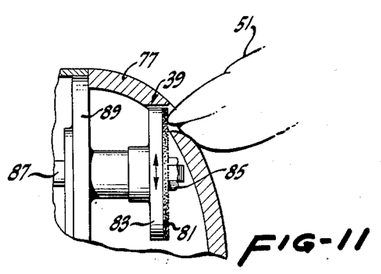
FIGURE 11 is an enlarged fragmentary view, partly in cross-section, of a portion of the adaptation of FIGURE 9.

In the operation of the manicuring modification of FIGURES 9, 10 and 11, fingernail 53 is inserted as in FIGURE 11 through the opening in shaped notch 39 and finger 51 rotated with varying pressure to give the desired configuration. The lower portion of shaped notch 31 may have a raised portion in the central part to give the automatic conventional manicure as described in connection with previous figures.

Figures 12, 13, 14, 15, 16, 17:
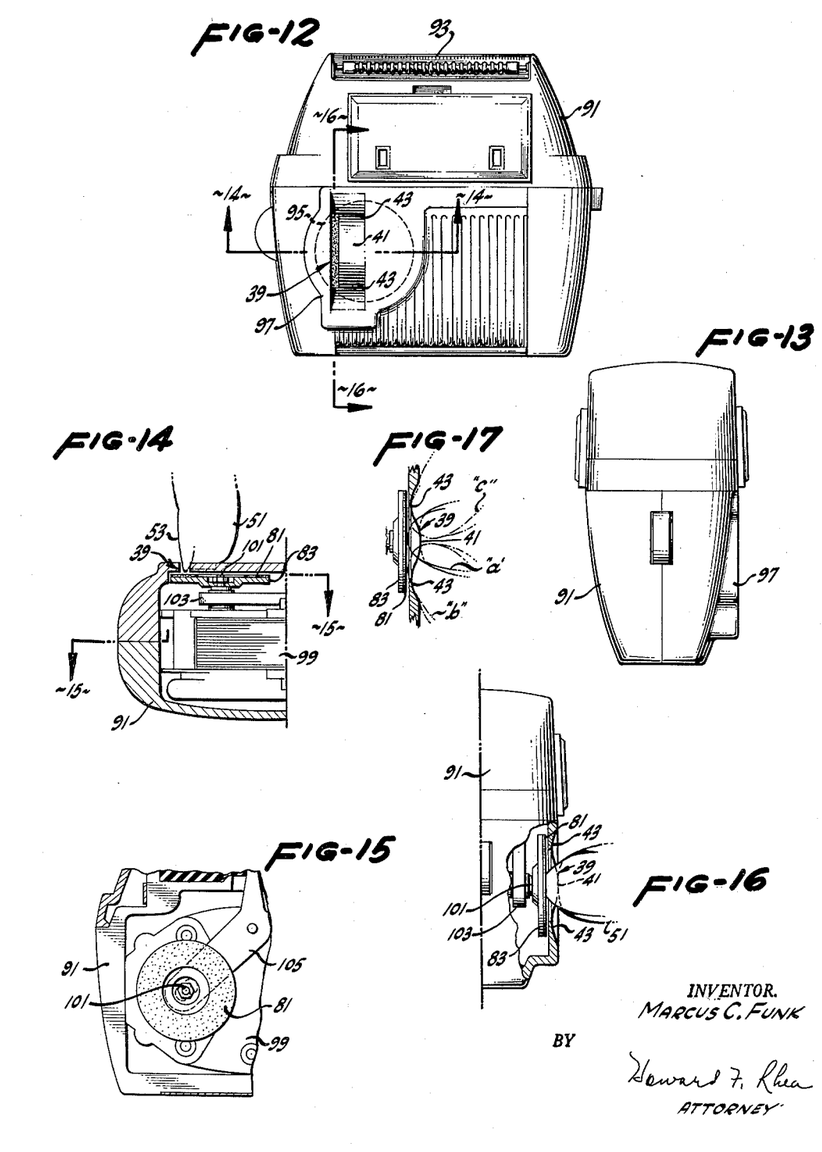
FIGURE 12 is a front elevational view of the manicuring adaptation of the invention herein as applied to a Remington type razor.
FIGURE 13 is an end elevational view of the adaptation of FIGURE 12.
FIGURE 14 is a cross sectional view of a portion of the adaptation taken along the lines 14—14 of FIGURE 12.
FIGURE 15 is a view, partly in cross section, of an internal portion of the adaptation of FIGURE 12.
FIGURE 16 is a view, partly in cross section, taken along the lines 16—16 of the adaptation of FIGURE 12, which has been broken away for a portion thereof.
FIGURE 17 is a fragmentary view, partly in cross section, of a portion of the adaptation of FIGURE 12.
Figure 18:
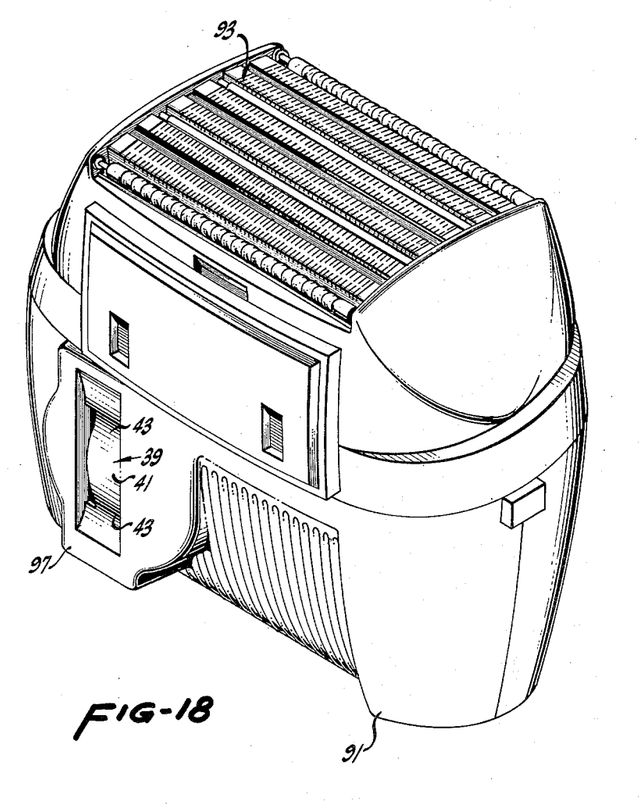
FIGURE 18 is a perspective view of the adaptation of FIGURE 12.

Referring to FIGURE 12, a Remington type razor housing 91 and a shaving head 93 have been modified by the addition of a boss 97. Boss 97 is preferably added because of the thinness of razor housing 91, thereby increasing the thickness of razor housing 91 so that shaped notch 39 including raised center portion 41 and lowered end portions 43 may be conveniently accommodated.

Adjacent to and underneath the opening in shaped notch 39 is an abrasive disc 95 which is connected to and driven by the razor motor 99 (FIGURE 14) as will be hereinafter described.

FIGURE 14 shows razor motor 99 connected to a shaft 101 journaled through bearing 103 immediately adjacent to motor 99. Wheel 83 having an abrasive disc 81 affixed thereto or an abrasive integrally therewith as previously described, is connected to shaft 101. Motor 99 is supported by razor housing 91. Fingernail 53 of finger 51 is projected through the opening in shaped notch 39 at approximately right angles to housing 91 to contact abrasive disc 81. In FIGURE 15 abrasive disc 81 and wheel 83 are mounted on the end of shaft 101. Shaft 101 also drives operating arm 105 for the razor blade mechanism. Housing 91, as before, provides support for motor 99 and related parts.

In the side view of FIGURE 16, shaft 101 is journaled through bearing 103 and has wheel 83 and abrasive disc 81 secured thereto. Shaped notch 39 including raised center portion 41 and lowered end portions 43 has finger 51 resting thereon with fingernail 53 projecting through the opening in said shaped notch 39 to contact abrasive disc 81.

FIGURE 17 illustrates the manicuring operation. In FIGURE 17, finger 51 is rotated from position *a* to positions *b* and *c* in any order desired by the person using the implement and fingernail 53 is manicured during its rotation on shaped notch 39 including raised center portion 41 and lowered end portions 43, ordinarily in the conventional fashion as hereinabove explained. It is, of course, possible as before, to vary the pressure of finger 51 on shaped notch 39, and to vary the angle of finger 51 relative to abrasive disc 81, to obtain any desired configuration in the manicuring operations as hereinabove explained in connection with FIGURES 1, 2 and 3.

Figure 19:
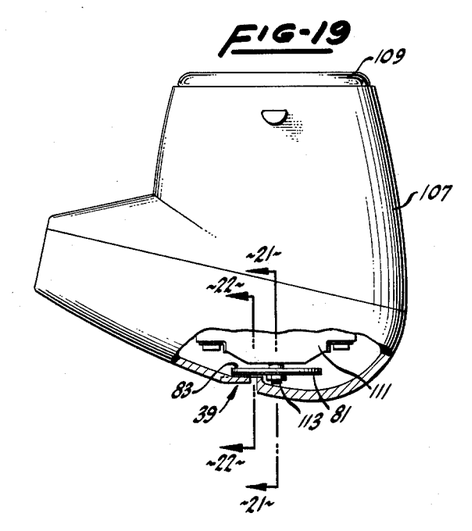
FIGURE 19 is a front elevational view, with a portion of the casing removed, of the manicuring modification of the invention herein as applied to a Norelco type shaver.
Figure 20:
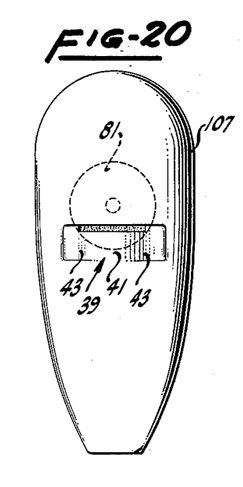
FIGURE 20 is an end elevational view of the modification of FIGURE 19.
Figure 21:
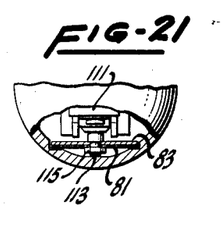
FIGURE 21 is a fragmentary view, partly in cross section, of the modification of FIGURE 19.
Figure 22:
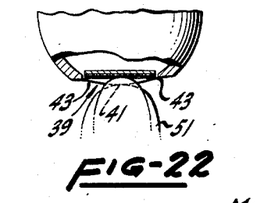
FIGURE 22 is an enlarged fragmentary view of a portion of the modification of FIGURE 19.
Figure 23:
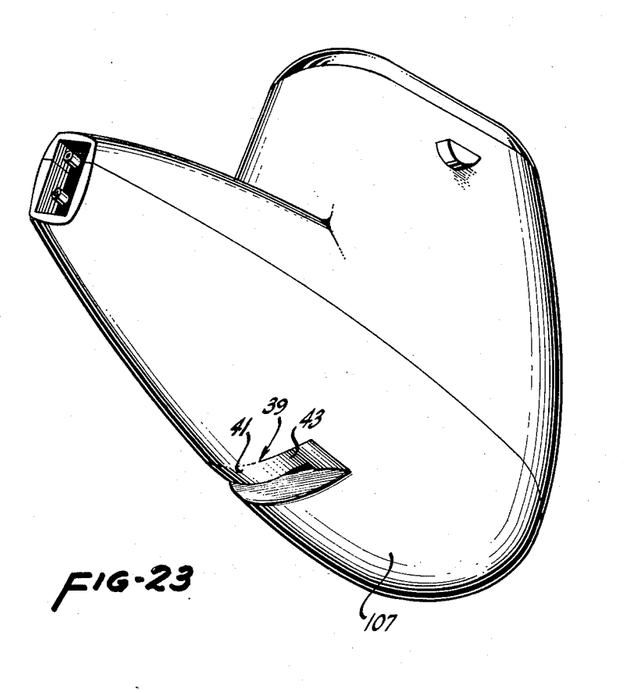
FIGURE 23 is a perspective view of the modification of FIGURE 19.

Referring to FIGURE 19, a Norelco type razor housing 107 having a shaving head 109 has been combined with the modification of the invention. Motor 111 is connected through shaft 113 to wheel 83 having an abrasive disc 81 mounted thereon. As before, the abrasive may be only a coating on wheel 83, or a corrugation thereon.ABrasive disc 81 are secured to shaft 113 by nut 115. Adjacent to abrasive disc 81, a shaped notch 39 is provided by modification of housing 107 for a finger rest. Referring to FIGURE 20, the modification of housing 107 to provide shaped notch 39 includes a raised center portion 41 and lowered end portions 43 adjacent to the opening in notch 39. Immediately below notch 39 is abrasive disc 81 (shown in dotted outline). In FIGURE 21, motor 111 is connected through shaft 113 to wheel 83, having abrasive disc 81 mounted thereon or an integral part thereof, and the assembly is secured by nut 115. Finally, referring to FIGURE 22, finger 51 is positioned on shaped notch 39, including center portion 41 and lowered end portions 43. Manicuring is obtained by rotating finger 51 on shaped notch 39 as hereinabove described. In the perspective view of FIGURE 23, shaped notch 39 includes a raised center portion 41 and lowered end portions 43 formed in housing 107.

While many of the possible environments of the invention have been shown and described hereinabove, it will be apparent to those skilled in the art that still further environmental adaptation of the invention herein may be made, and it will also be apparent that minor modifications in the exact form of the elements of the invention may also be made herein without departing from the scope and spirit hereof. The invention, accordingly, is to be limited only by the following claims.

I claim:

1. The combination of an electric razor including an electric motor, a shaving head and a housing mounting said motor and head in operable relation, wtih a manicuring implement integrally combined with said razor, said implement comprising an abrasive element mounted adjaecnt to said housing, means operably connecting said abrasive element to said electric motor, and a finger rest formed on said housing adjacent to said abrasive element, said finger rest including a longitudinal slot formed to permit access through said housing throughout the length of said slot to said abrasive element and an element curved with respect to a plane approximately parallel with the plane of said abrasive element, said curvature being such that the central portions of said element so curved are more distant from said abrasive element than the end portions thereof.

2. In an electric razor having an electric motor, a shaving head, means coupling said motor and head and a casing surrounding said motor and providing a mounting for said head, a manicuring implement comprising an abrasive element mounted within said casing and adjacent thereto, means connecting said abrasive element to said motor, an aperture in said casing adjacent to said abrasive element, said aperture having a longitudinal dimension substantially greater than its transverse dimension, and a shaped finger rest along said aperture on at least one of its longitudinal sides, said finger rest including an area at the center of said longitudinal dimension more distantly removed from said abrasive element than the end areas thereof.

References Cited in the file of this patent
UNITED STATES PATENTS

| | | |
|---|---|---|
| 1,682,475 | Blomquist | Aug. 28, 1928 |
| 1,719,063 | Lidseed | July 2, 1929 |
| 2,877,775 | Hall | Mar. 17, 1959 |
| 2,936,768 | Chamberlain | May 17, 1960 |

FOREIGN PATENTS

| | | |
|---|---|---|
| 1,026,746 | France | Feb. 11, 1953 |